Sept. 20, 1927.

A. L. GENTER

1,642,673

METHOD OF THICKENING MIXTURES

Filed July 16, 1925

Patented Sept. 20, 1927.

1,642,673

UNITED STATES PATENT OFFICE.

ALBERT LEGRAND GENTER, OF SALT LAKE CITY, UTAH, ASSIGNOR, BY MESNE ASSIGNMENTS, TO GENTER THICKENER COMPANY, A CORPORATION OF DELAWARE.

METHOD OF THICKENING MIXTURES.

Application filed July 16, 1925. Serial No. 43,957.

This invention relates to methods of filtering and thickening mixtures such, for example, as the method described in Patent No. 1,379,095 granted in my name on May 24th, 1921. The object of the invention is the provision of an improved method of filtering and thickening mixtures of liquids and solids.

According to the method of my prior patent above referred to, the mixture to be thickened is continuously supplied to a container in which there is located one or more hollow filter elements or media that are maintained continuously submerged in the mixture. The liquid product is removed from the mixture through the interior of the filter elements. The solids which collect on the outside of the filter media are periodically removed therefrom and thicken the mixture. These solids accumulate at the bottom of the container and are removed through a suitable discharge opening.

The present invention relates more particularly to the filtering and thickening of hot mixtures, mixtures containing relatively large amounts of dissolved or absorbed gases or the like, and mixtures of a relatively volatile character and the term "hot mixtures" as used in this specification will be understood to include all mixtures that have a tendency to vaporize or liberate gas when subjected to a reduction in pressure.

In the filtering of hot liquids by suction, many difficulties are encountered which are not met with in the suction filtration of other liquids. Perhaps the greatest of these results from the fact that when suction is applied the hot liquid has a tendency to vaporize, the extent of vaporization depending upon the temperature of the liquid and the amount of suction. Thus it is a well known fact in the physics connected with the pumping of hot liquids that suction will not lift a liquid heated to its boiling point, that is, lift it above the surface exposed to atmospheric pressure, because the suction lift pressure equals the atmospheric pressure minus the vapor pressure of the liquid, and at the boiling point both of these pressures are equal so that the lift pressure is zero. Hence it has been difficult in the past to filter hot mixtures because of the fact that the filtrate has to be lifted above the level of the mixture and, if the temperature of the filtrate is close to the boiling point a relatively large portion thereof is vaporized.

The removal from the filtering apparatus of this vaporized filtrate which occupies very much greater volume than the liquid filtrate has required the installation of vacuum pumps of excessively large displacement and therefore of relatively high cost. For this reason it is important that the percentage of vapor in the filtrate removed from the apparatus be kept as low as possible, or, in other words that as much as possible of the filtrate from the apparatus be removed in liquid form. It is also important in the practical operation of apparatus of this general type that an effective periodic cleaning of the filter media be provided for.

The method and apparatus disclosed in the patent referred to have been operatively successful but by removing the filtrate and by applying the cleansing current in accordance with the principles of the present invention a greater rate of filtrate removal is obtained and a larger amount of material can be thickened in a given time with a given size of thickening apparatus than heretofore. In the method of filtering and thickening disclosed in this prior patent, the filtrate is withdrawn from the interior of the hollow filter elements through the top of each element and the cleansing current or "kick-back" which is used to dislodge the accumulated solids from the surfaces of the filter elements is also applied through this same opening.

The difficulty with making the connection between the filter element and the filtrate removal and kick-back piping at the top of the filter element proceeds from the formation of vapor when suction is applied to produce filtration. This vapor immediately cuts off the body of liquid from the filtrate removal piping with the result that the filtrate removed is largely in the form of vapor. Then, when the kick-back current is applied, unless the filter elements are completely submerged in the mixture, the cleansing fluid, whether air or liquid, will be short-circuited through the pores of the filter medium or "sock" above the level of the mixture. The energy of the cleansing fluid is thus wasted and the solids which have accumulated on the surfaces of the filter elements remain practically undisturbed.

According to the present invention, the hot mixture is subjected while in contact with the filtering medium to a filtering action in the course of which the liquid passing through the medium forms two filtrate columns joined together at the bottom; suction is applied to one of these columns of filtrate to produce the filtering action and to remove the filtrate, and in order to supplement the action of the suction in removing filtrate the density of the liquid in one of the columns is reduced so as to cause this liquid to be elevated above the mixture by the hydrostatic pressure of the liquid in the other column. This reduction in density may be secured in various ways. For example, it may be secured by introducing air near the bottom of the column which mixes with the liquid to form a mixture of air bubbles and liquid, or slugs of liquid separated by short columns of air. This will be recognized as an application of the "air lift" principle. Preferably, however, instead of introducing air, a similar effect in reducing the liquid density is produced by increasing the amount of suction or by raising the temperature of the filtrate so as to actually induce vaporization of the filtrate in this column. In this way I am able to make use of the formation of vapor referred to above for the purpose of assisting the suction action in the removal of filtrate, instead of retarding it as has heretofore been its most undesirable function. It will be understood that the elevation of the reduced density column by the pressure of the liquid in the other column of filtrate will of necessity cause the liquid in this column to flow downwardly and to take the place of the liquid which is being elevated in the reduced density column. Hence a continuous flow of liquid from one column to the other will take place.

The filtering action just described is, in accordance with the invention, periodically interrupted and the solids which have accumulated on the surface of the filtering medium are forced therefrom by the application of fluid pressure which is directed upwardly from the lower portion of the filtering medium and which therefore acts against the hydrostatic pressure of the mixture. In this way a film of liquid of substantially uniform thickness is caused to appear over the entire area of the outside of the filtering medium. The form of filtering medium employed is preferably tubular and during the filtering action the solids from the mixture accumulate substantially uniformly over its surface in a tube-like formation of more or less interconnected particles. The release of the suction and the appearance of the uniform film of liquid stretches this tube of solids somewhat and allows it to slip or "skid" down the surface of the tubular filtering medium under the action of gravity, the film of liquid serving as a sort of lubricant on the surface of the sock. The result is that the tube of solids is discharged into the mixture.

The invention will be further understood by referring to the accompanying drawings which illustrate more or less diagrammatic arrangements of apparatus suitable for carrying out the invention. In these drawings.

Figure 1:
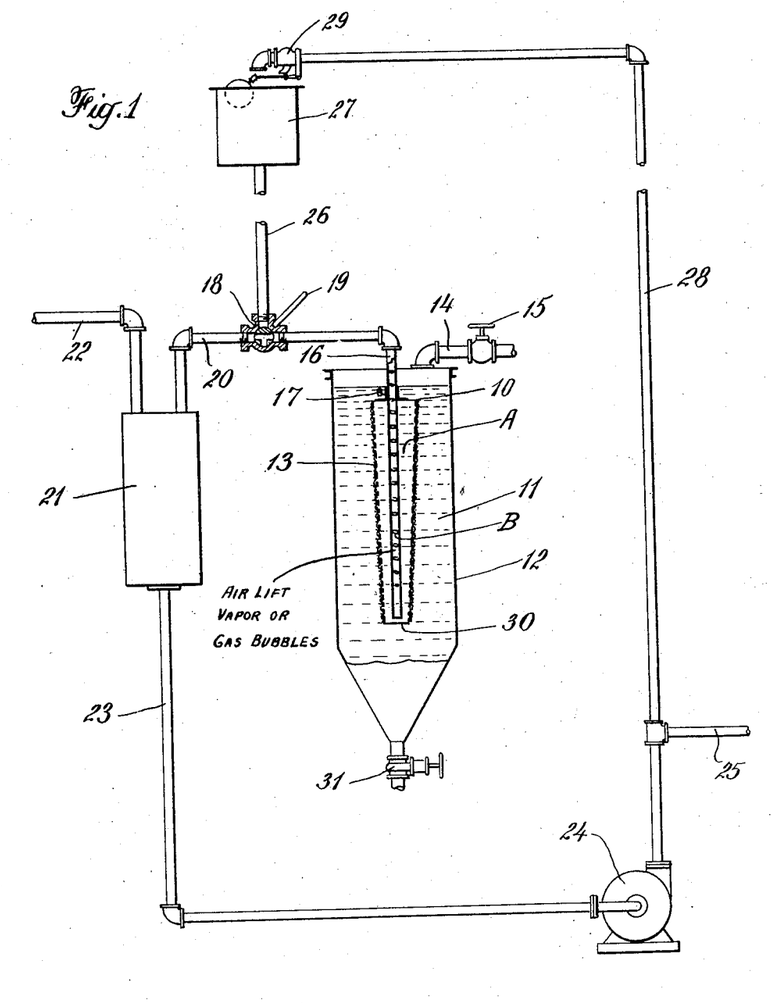
Fig. 1 is a diagrammatic view of an apparatus in which a purely liquid cleansing current is employed.
Figure 2:
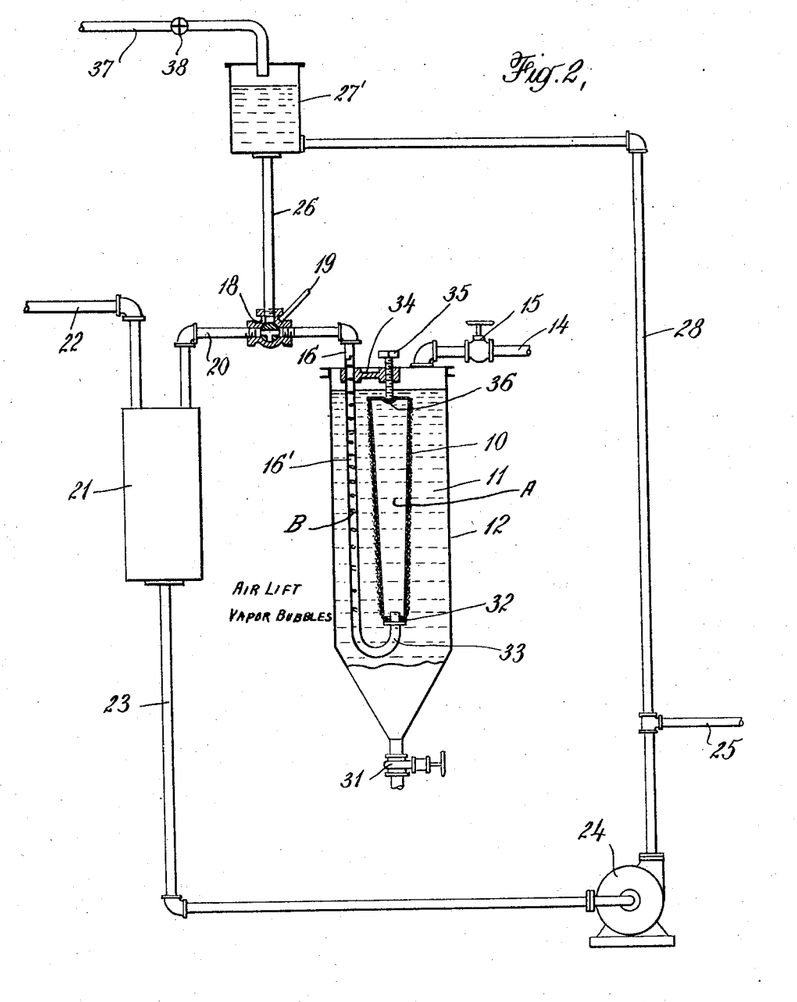
Fig. 2 is a similar view of a modified form of apparatus for producing also a purely liquid countercurrent, and also illustrating a modified form of filter element.
Figure 3:
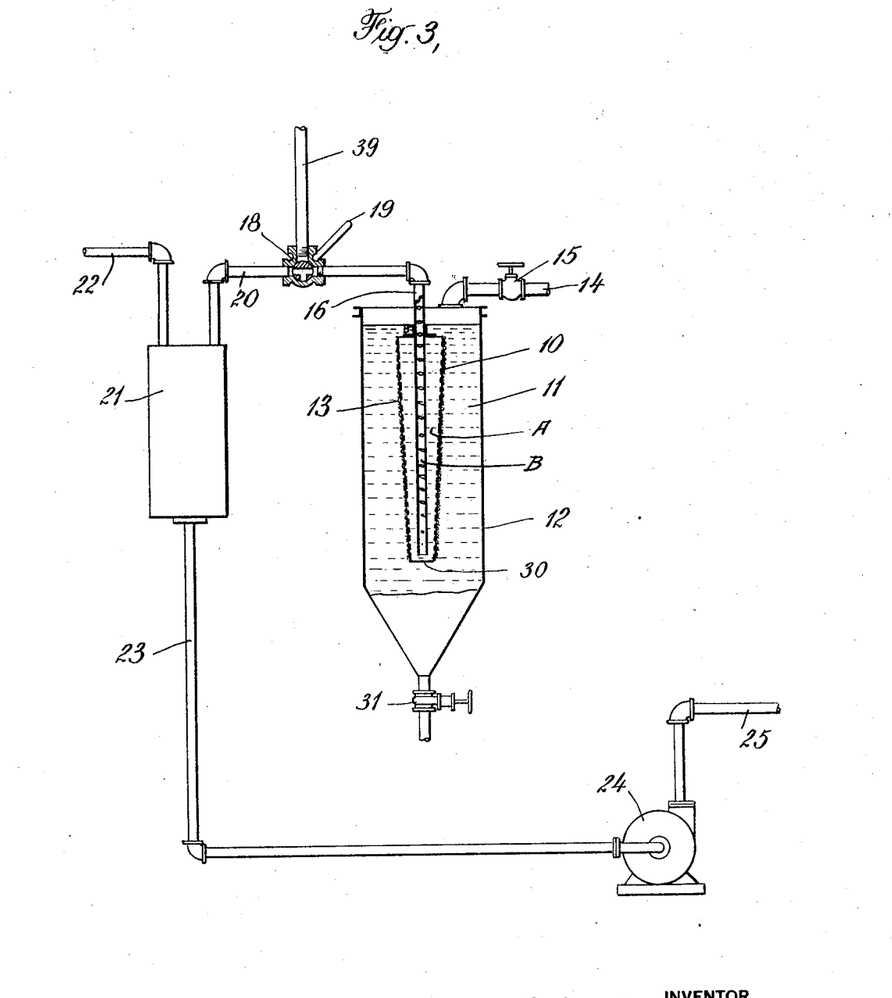
Fig. 3 is a similar view of an apparatus in which a combined liquid and air or gas cleansing current or "blow-back" is used.

Referring to these drawings, one or more filter elements 10 are submerged or immersed within the mixture to be thickened 11 which is contained within the tank 12. The filter element 10 comprises a suitable tubular frame upon which is supported a sock 13 consisting of canvas or other appropriate foraminous material. The mixture of liquids and solids to be thickened is supplied to the tank 12 through a supply pipe 14 which is controlled by means of a valve 15, the flow of the mixture being regulated in accordance with the operation of the remainder of the apparatus.

The filter element 10 is supported in any suitable manner, but as shown in Fig. 1 it is clamped to a pipe 16 by means of a screw 17 and pipe 16 extends centrally throughout the height of the filter element and substantially to the bottom thereof. The other end of pipe 16 is connected to a 3-way timing valve 18 which is provided with a handle 19 by which it may be moved through an angle of 90° to the left from the position shown. On the opposite side of the valve 18 from pipe 16 a second pipe 20 leads to a vacuum chamber and filtrate receiver 21. A vacuum producing means or pump of appropriate size and nature is connected with the vacuum chamber 21 through a pipe 22.

With the valve handle 19 in the position shown in the drawings the suction from the vacuum chamber 21 causes liquid from the mixture 11 to pass through the walls of the sock 13 and the filtering action commences. During the course of this action the filtrate collects in the interior of the filter element 10 in the form of a vertical column of liquid A, and it also rises in the pipe 16 to form a second column B which is joined at the bottom to filtrate column A.

Inasmuch as the mixture 11 is at a temperature in the vicinity of the boiling point the continued application of suction causes the pressure above the filtrate in column B to be reduced sufficiently for vaporization to take place. This vaporization is accompanied by the formation of bubbles of vapor in the filtrate. The depth below the surface of the mixture 11 at which these bubbles of vapor form will depend on the reduction in pressure in pipe 16 and the temperature of the liquid in column B. The formation of these bubbles has been indicated diagrammatically in the drawings.

If the filtrate removal pipe 16 opens directly into the top of the filter element as has been usual in the past, the bubbles of vapor form directly in the column of filtrate A within the filter element and, rising to the surface displace the liquid at the top of the interior of the element. This occurs very shortly after the application of suction and immediately disconnects the body of liquid within the filter element from the outlet pipe 16 with the result that substantially all of the filtrate that is withdrawn is in the form of vapor. Some liquid particles are entrained in the vapor by the bubbling and surging of the filtrate as it vaporizes but this is practically all of the filtrate that is removed in the form of liquid.

By causing the filtrate to form two columns joined together at the bottom and then applying suction to one of these columns, I have found that the formation of vapor caused by the suction may be employed to advantage in increasing the percentage of filtrate that is removed in liquid form. The formation of the bubbles of vapor in column B above described causes the previously existing column of solid liquid to be replaced by a mixture of vapor bubbles and liquid, or, particularly when the column B is of relatively small cross-section as indicated in the drawings, this column consists of slugs of liquid separated by bubbles of vapor which lift liquid in column B by their inherent expansive force as they rise in column B. In either event, the density of column B is materially reduced with respect to that of column A which is substantially all liquid. Columns B and A form the U-tube of an "air-lift", column A acting as the so-called "well" and column B, which is preferably of smaller diameter and longer than column A, acting as the so-called "riser" for the removal of liquid. The vapor formation is substantially confined to column B and produces what may be termed an "air-lift" action on the filtrate in column B, that is, every vapor or air bubble formed within column B displaces an equivalent volume of filtrate and the liquid in column B will then rise. Although the theory of the air-lift may not be entirely settled I believe that this rise of the liquid in column A is caused: first, by the constant effort of the lighter combination of liquid and vapor bubbles in column B to establish a balance with the relatively heavier liquid in column A. In other words, by the difference between the densities of the liquids in these two columns. Second, by the inherent expansive force of the vapor bubbles in column B which increase in size as they rise to the top of column B. If the riser or longer column B is carried to valve 18 below the point at which the hydrostatic balance between columns B and A takes place filtrate will flow out through pipes 16, valve 18, pipe 20 and into receiver 21 as long as vapor bubbles are formed within column B.

The elevation to which column B will be lifted by this effect depends upon the distance that the lower end of pipe 16 is submerged below the level of liquid in column A and on the relative densities of the two columns. The pumping action or rate of pumping depends upon the proportion of the total length of column B that is submerged below the level of liquid in column A and upon the rate that the density of column B is reduced. This rate of reduction of density in turn varies with the amount of the vacuum and the temperature of the liquid entering column B. Again the pumping action also depends on the depth at which the bubbles of vapor begin to form. The higher the temperature or the vacuum, the lower down will the formation of vapor take place and the greater the pumping action.

A pipe 23 connects with the bottom of vacuum chamber and filtrate receiver 21 and conveys the liquid filtrate to a filtrate pump 24 which is provided for withdrawing the filtrate from the vacuum receiver. The filtrate, that is, the clear liquid product of the thickening operation, is discharged through an outlet pipe 25. The reduction in the temperature of the filtrate by the time it reaches receiver 21 may be sufficient to cause the recondensation of the vaporized portion thereof. If this is not the case a condenser is inserted in pipe line 22.

In order to provide a cleansing current, which is in this case liquid, a pipe 26 leads from timing valve 18 to a reservoir 27 for liquid that is elevated a sufficient distance above timing valve 18 and the filter element 10 to produce a sufficient liquid pressure or head to effect the removal of the solids from the exterior of the filter medium 13 in the required time.

Any appropriate liquid may be supplied to reservoir 27, but preferably a portion of the filtrate coming from pump 24 is lifted to reservoir 27 through an appropriate pipe 28. A float-operated valve 29 maintains the reservoir 27 full of liquid filtrate at all times.

It will be remembered that with the valve 18 in the position shown in Fig. 1 liquid from the mixture 11 is being carried into the receiver 21. If now the valve 18 be shifted 90° to the left by means of handle 19 the pipe 16 will be cut off from vacuum receiver 21, the passage of liquid to the interior of filter element 10 will cease, and the countercurrent or "kick-back" will take place, the filtrate from reservoir 27 rushing down through pipe 26, valve 18 and pipe 16. The pressure of the countercurrent condenses the vapor left within pipe 16 and column B from the previous filtration period and forces the liquid from column B out of the lower end of pipe 16 into column A, the cap 30 reversing the direction of this liquid and directing it upwardly on the interior of the filter element.

During the filtration period a tube-like formation of interconnected solids has been formed on the exterior surface of the sock 13 and has reached a thickness which interferes with the flow of clear liquid through the sock.

The pressure of the upwardly directed "blow-back" liquid is sufficient to overcome the pressure of the mixture 11 which surrounds the filter element 10 and to force filtrate from the interior of element 10 through the walls of the filter medium 13 and form a film of liquid on the exterior of filter medium 13 which stretches slightly and thus loosens the tube-like formation of solids that has collected on this surface during the previous filtration period. The difference in pressure between the interior and exterior of filter element 10 will be greater towards the top than near the bottom, but because of the pressure due to the hydrostatic head of the mixture 11, and also that of the filtrate within the element 10, there will be a substantial difference in pressure between the interior and exterior at the bottom of element 10. The distribution of pressure is sufficiently uniform to force liquid outwardly through all portions of the filter medium 13 and to cause a liquid film of substantially uniform thickness to appear over the outside surface of the sock.

The tube-like formation of solids which has thus been flooded out of actual contact with the surface of the sock by the countercurrent which oozes suddenly through all the pores of the sock slips or "skids" down the entire surface of the tubular sock and this "tube" of solids is discharged into the mixture and continues to settle toward the bottom of tank 12. These solids collect here and are withdrawn either continuously or intermittently through a valve-controlled outlet 31.

It will be understood that the valve 18 is switched back and forth periodically so as to first produce filtration and then cleansing periods. The operation of this valve is preferably made to occur with extreme suddenness and at relatively frequent intervals in accordance with the principles set forth in my copending application Serial No. 863,890. Thus the duration of the period of filtration is sometimes as low as about 30 seconds and the duration of the period of application of cleansing fluid or "blow-back" is as low as about 2 seconds.

At the beginning of the cleansing period when the countercurrent suddenly expands the tube of solids, this tube immediately commences to fall or slide down the surface of the sock. Within two or three seconds, inasmuch as the tube of solids retains its mass formation instead of being broken up, it gains such a velocity that if filtration is again immediately applied the tube of solids will not be redeposited upon the sock. Before it can be redeposited, its downward motion must be arrested and it must be again drawn into contact with the cloth. This, however, requires fully another second of time and meanwhile the tube has fallen to such a depth that the area of the tube opposite the filter element is greatly reduced, a large portion of the tube extending below the bottom end of the filter element. Hence the force exerted upon the tube by the suction is reduced to such an extent that the tube is not again drawn into contact with the filter element and falls clear of the bottom thereof. The rate of falling of the tube of solids depends largely upon the character of material being thickened, and the duration of the kick-back or cleansing period is varied to suit conditions.

When operating on the relatively short and sudden cycle mentioned above the principles of the present invention may be employed with added advantages. The primary result which is sought is that of securing the greatest possible rate of removal of filtrate in liquid form when filtering hot mixtures. It is well known in connection with the operation of air lifts that it requires a higher air pressure (greater vapor pressure in the present case) to start an air lift than is required after the air lift is set in operation. This pressure must be equal to the pressure due to the head of the liquid above the lowest portion of the submerged pipe. In using the frequent liquid countercurrent kick-back the air lift conditions are destroyed at each kick-back and the vapor within the pipe 16 and the filter element is condensed. Then when the suction impulse is again applied a solid column of liquid is removed from pipe 16 and the filter element because of the fact that before the air lift action can again commence the vapor pressure must be higher than it was previously when the air lift action was in operation. This means a slightly higher temperature or a higher vacuum and a short time interval before vapor formation will again be resumed.

This slightly higher vacuum aids in liquid filtrate removal and when vapor formation again occurs to any appreciable extent it is confined principally to the column B where its air lift pumping action is of a beneficial influence rather than being detrimental. There is a further advantage in applying the cleansing current with the utmost possible suddenness and this is because the sudden appearance of the film of liquid oozing out through the pores of the sock quickly breaks the contact between the tube of solids and the sock. The quicker this contact is broken by the countercurrent flood the more the entire tube of sediment hangs together and the faster it drops on account of its thus increased weight. It is important to maintain the continuity of this tube of solids to as great an extent as possible because if it is discharged from the surface of the sock in small pieces these do not fall through the liquid as rapidly and some of the pieces are redeposited upon the sock when the filtration impulse comes on again. With the sudden uniform flooding described above the entire sediment film or tube expands away from the element surface and skids down the countercurrent film.

The apparatus shown in Fig. 2 is similar to that shown in Fig. 1 except for the fact that the filter element is of slightly different construction and the liquid countercurrent is secured in a somewhat different manner. The filtrate removal pipe 16′, containing filtrate column B of reduced density, passes downwardly on the outside of filter element 10′ which is provided at its bottom with an aperture and washer 32 by which a liquid-tight connection is made with the return bend 33 at the lower end of pipe 16′. The upper end of the filter element is supported by a bracket 34 secured to pipe 16′ and which has a hand screw 35 threaded therethrough into engagement with a locking device such as the recess 36 in the top of filter element 10′.

In order to provide the liquid for the cleansing current or "blow-back," filtrate is returned to a reservoir 27′ as previously described in connection with Fig. 1 but this reservoir may be located very close to valve 18 inasmuch as the pressure for the cleansing current is produced by compressed air or steam which is supplied to the top of the closed reservoir 27′ through pipe 37 and valve 38.

In operation this apparatus may be employed to carry out the same method of thickening as the apparatus shown in Fig. 1. The valve 18 is operated in the same manner and filtration and cleansing occurs in the same manner.

Referring now to Fig. 3 of the accompanying drawings, there is here shown a third form of apparatus for carrying out the method of the present invention in which the cleansing fluid may be entirely liquid or liquid followed by air, gas or steam. The form of filter element shown is the same as that shown in Fig. 1. Also valve 18 is the same. This valve, however, instead of being supplied with liquid from a reservoir as in the previously described apparatus is supplied with air, gas or steam only through the pipe 39.

When valve 18 is thrown from the position shown in Fig. 3 through an angle of 90° to the left, the filtration pressure is cut off and the air pressure acts upon the filtrate which remains in pipe 16 to compress the vapor therein and force the liquid upwardly against the pressure of the mixture 11 surrounding the filter element 10, and after a substantial amount of filtrate from the interior of element 10 and from pipe 16 is forced through the walls of the filter medium 13, the air itself will then enter the interior of the element 10 and be forced through the filter medium 13. This action will not occur, however, unless valve 18 is left in the "blow-back" position for a sufficient length of time to use up the liquid from pipe 16.

A combination of liquid and air cleansing fluids may be desirable in some instances as the current of liquid through the porous filter medium effects a better dislodgment of solids from the exterior surface of the medium than air, but air in bubbling back through the porous material cleans out the incrustation between the interstices of the cloth of the sock better than the liquid. The liquid, however, dislodges the cake of accumulated solids instantaneously whereas it is extremely difficult, if not impossible, to secure a sufficiently prompt and complete distribution of air throughout the interior of the filter element to produce this instantaneous cleaning.

Even if this could be secured, however, it has the disadvantage of breaking up or disintegrating the tube-like formation of sediment or solids so that the small pieces of sediment which settle relatively slowly are liable to be again deposited on the sock during the next filtration impulse. It is important therefore that no air or gas countercurrent should reach the interior of the filter element during the flooding operation by the countercurrent of liquid.

In order to adjust for the proper amount of liquid for any given duration of "blow-back," and to prevent compressed air or such from entering the element itself and thus retarding the air lift action in removing the filtrate from pipe 16 and element 10 as hereinbefore described, the size of the pipe 16 may be varied, or a suitable filtrate storage chamber may be inserted between valve 18 and the bottom end of pipe 16.

When the method of the present invention is practiced in any of the apparatus described above a greatly improved rate of removal of filtrate is secured in the filter-thickening of hot liquids. The percentage of liquid in the filtrate removed is remarkably increased. In fact it has been found in practice that the vacuum pump displacement used in the filtration of cold non-vaporizing liquids, needs to be increased only to a relatively small extent when hot liquids are filtered in accordance with the principles of the present invention. The "blow-back" current, being applied so as to act against the pressure of the mixture surrounding the filter element greatly facilitates the cake removal and the rapidity of the settling of the solids or sediment. A lowering of the level of the mixture considerably below the tops of the filter elements may take place without substantially any variation in the quality of the filtrate or the quality of the thickened product, or even in the rate of filtration or thickening except that which would be expected because of the reduced filtering area.

The employment of the air lift principle, that is, the reduction in density of one of the connected columns of filtrate furthermore presents an added advantage from the standpoint of economic design of the filter-thickening apparatus. The fact that this enables the filtrate to be lifted to an almost indefinite elevation above the surface of the mixture to be filtered by suitably proportioning the relative sizes of the two columns of filtrate and by appropriately controlling the reduction of density, enables the timing or actuating valve 18 to be placed above the filter elements and the tank containing them where it can be more conveniently installed and operated. In the construction of commercial filtering apparatus a quickly detachable joint is provided in the pipe 16 so that the filter element 10 can be quickly replaced. Because of the permissible lengthening of pipe 16 when the present invention is employed this joint can be placed at a sufficient distance above the tank 12 so that dirty unfiltered mixture will not come in contact with the joint after it is broken and thus contaminate clear liquid filtrate that will flow through this joint when a new or repaired element is again in place.

I claim:

1. The method of filtering hot mixtures or the like which comprises subjecting the mixture while in contact with a filtering medium to a filtering action in the course of which the liquid passing through the medium forms two filtrate columns joined together at the bottom, applying suction to one of said columns to promote the filtering action, and reducing the density of the liquid in said column so as to cause the same to be elevated above the liquid level in the other column by the difference between the densities of the liquids in said columns.

2. The method of filtering hot liquid mixtures or the like which comprises subjecting the mixture while in contact with a filtering medium to a filtering action in the course of which the liquid passing through the medium forms two filtrate columns joined together at the bottom, applying suction to one of said columns to promote the filtering action and to withdraw the filtrate from said columns, and enhancing such withdrawal by reducing the density of the liquid in said column so as to cause the same to be elevated by the difference between the densities of the liquids in said columns.

3. The method of filtering hot mixtures or the like which comprises subjecting the mixture while in contact with a filtering medium to a filtering action, the liquid passing through the medium forming two filtrate columns joined together at the bottom, one of said columns being of smaller cross section than the other, and reducing the density of the liquid in the smaller column so as to cause the same to be elevated above the liquid level in the other column by the difference between the densities of the liquids in said columns.

4. The method of withdrawing filtrate from a hollow submerged filter element during the filtration of hot mixtures or the like which comprises applying suction to the interior of the filter element and supplementing said suction by reducing the density of the liquid contained in an upwardly directed column of filtrate conducted from the bottom of the filter element so as to cause this liquid to be elevated by the difference in densities between the liquids contained in the filter element and in the column of filtrate conducted therefrom.

5. The method of filtering hot mixtures or the like which comprises subjecting the mixture while in contact with a filtering medium to a filtering action in the course of which the liquid passing through the medium forms two filtrate columns joined together at the bottom, and applying suction to one of said columns to promote the filtering action and thereby to reduce the density of the liquid in said column so as to cause the same to be elevated above the liquid level in the other column by the difference between the densities of the liquids in said columns.

6. The method of filtering hot mixtures or the like which comprises subjecting the mixture while in contact with a filtering medium to a filtering action in the course of which the liquid passing through the medium forms two filtrate columns joined together at the bottom, applying suction to one of said columns to promote the filtering action and thereby to reduce the density of the liquid in said column so as to cause the same to be elevated above the liquid level in the other column by the difference between the densities of the liquids in said columns, and periodically interrupting the filtering action and forcing the accumulated solids from the surface of the filtering medium against the pressure of the mixture by the application of fluid pressure directed upwardly from the lower portion of the filtering medium.

7. The method of thickening hot mixtures or the like which comprises subjecting the mixture while in contact with a tubular filtering medium to a filtering action in the course of which solids accumulate on the exterior of the medium in a tube-like formation of slightly interconnected particles and the liquid passing through the medium forms two filtrate columns joined together at the bottom, applying suction to one of said columns to promote the filtering action and thereby to reduce the density of the liquid in said column so as to cause the same to be elevated above the liquid level in the other column by the difference between the densities of the liquids in said columns, and periodically interrupting the filtering action and interposing a substantially uniform film of liquid between the filtering medium and said solids formation so as to cause it to slide down the surface of the filtering medium, the lower portion thereof being discharged into the mixture to thicken the same.

8. The method of filtering hot mixtures or the like which comprises subjecting the mixture while in contact with a filtering medium to a filtering action in the course of which the liquid passing through the medium forms two filtrate columns joined together at the bottom, applying suction to one of said columns to promote the filtering action and thereby to cause the partial vaporization of the liquid in said column, so as to cause the same to be elevated above the liquid level in the other column by the difference between the densities of the liquids in said columns, and periodically interrupting the suction and applying pressure instead so as to recondense the vaporized liquid and force liquid from the other column through the filtering medium against the pressure of the mixture to dislodge the accumulated solids from the exterior of the filtering medium.

9. The method of filtering hot mixtures or the like which comprises subjecting the mixture while in contact with a filtering medium to a filtering action in the course of which the liquid passing through the medium forms two filtrate columns joined together at the bottom, applying suction to one of said columns to promote the filtering action and to withdraw the filtrate from said columns, and enhancing such withdrawal by causing an air-lift action in one of the columns so as to effect the elevation of the liquid therein above the liquid level of the other column.

10. The method of filtering hot mixtures or the like which comprises subjecting the mixture while in contact with a filtering medium to a filtering action in the course of which the liquid passing through the medium forms two filtrate columns joined together at the bottom, applying suction to one of said columns to promote the filtering action and to withdraw the filtrate from said columns, and enhancing such withdrawal by causing an expansible fluid to appear in one of the columns so as to reduce the density of the liquid therein and cause the same to be elevated by the difference between the densities of the liquids in said columns.

11. The method of filtering hot mixtures or the like which comprises subjecting the mixture while in contact with a filtering medium to a filtering action in the course of which the liquid passing through the medium forms two filtrate columns joined together at the bottom, applying suction to one of said columns to promote the filtering action and to withdraw the filtrate from said columns, and enhancing such withdrawal by introducing into one of the columns an expansible fluid so as to reduce the density of the liquid therein and cause the same to be elevated by the difference between the densities of the liquids in said columns.

12. The method of filtering hot liquid mixtures or the like which comprises passing the liquid through a filtering medium which is submerged in the liquid to be filtered, forming the filtrate into two columns joined together at the bottom and extending to the surface of the liquid to be filtered, applying suction to one of said columns to promote the filtering action, and reducing the density of said columns so as to cause the liquid therein to be elevated above the liquid level of the other column by means of the difference between the densities of the liquids in said columns.

In testimony whereof I affix my signature.

ALBERT LEGRAND GENTER.

Certificate of Correction.

Patent No. 1,642,673. Granted September 20, 1927, to

ALBERT LEGRAND GENTER.

It is hereby certified that error appears in the printed specification of the above-numbered patent requiring correction as follows: Page 7, line 103, claim 12, for the word "columns" read *column*; and that the said Letters Patent should be read with this correction therein that the same may conform to the record of the case in the Patent Office.

Signed and sealed this 18th day of October, A. D. 1927.

[SEAL.] M. J. MOORE,
*Acting Commissioner of Patents.*